United States Patent [19]

Schuurman

[11] 4,398,521

[45] Aug. 16, 1983

[54] DUAL FLOW PROPANE UNIT

[75] Inventor: Eiko A. Schuurman, Nieuwegein, Netherlands

[73] Assignee: John M. McNamara, Port Jefferson Station, N.Y. ; a part interest

[21] Appl. No.: 294,221

[22] Filed: Aug. 19, 1981

[51] Int. Cl.³ .................................... F02M 15/00
[52] U.S. Cl. ............................ 123/527; 123/27 GE; 48/180 R; 48/180 C
[58] Field of Search ........... 123/527, 523, 525, 276 E, 123/575; 261/16; 48/180 R, 180 C

[56] References Cited

U.S. PATENT DOCUMENTS 2,262,013 11/1941 Lang ..................................... 123/523
2,939,775 6/1960 Middleton et al. .................. 123/527
4,135,483 1/1979 Edwards ............................. 123/523

Primary Examiner—Charles J. Myhre
Assistant Examiner—E. Rollins Cross
Attorney, Agent, or Firm—Leonard Belkin

[57] ABSTRACT

A propane supply unit for use with gasoline powered automotive internal combustion engines to replace the liquid fuel. The unit consists of a plurality of circular or otherwise formed tubular elements supplied with gas from a common manifold located within the air cleaner housing. The tubular elements are spaced so as to divide up the air flow. Openings in the elements are located as to face the spaces between the elements and discharge the gaseous fuel into the separate streams of air. The unit does not alter the normal air flow conditions so that no modification of the existing engine control system is required when the supply unit is used.

8 Claims, 5 Drawing Figures

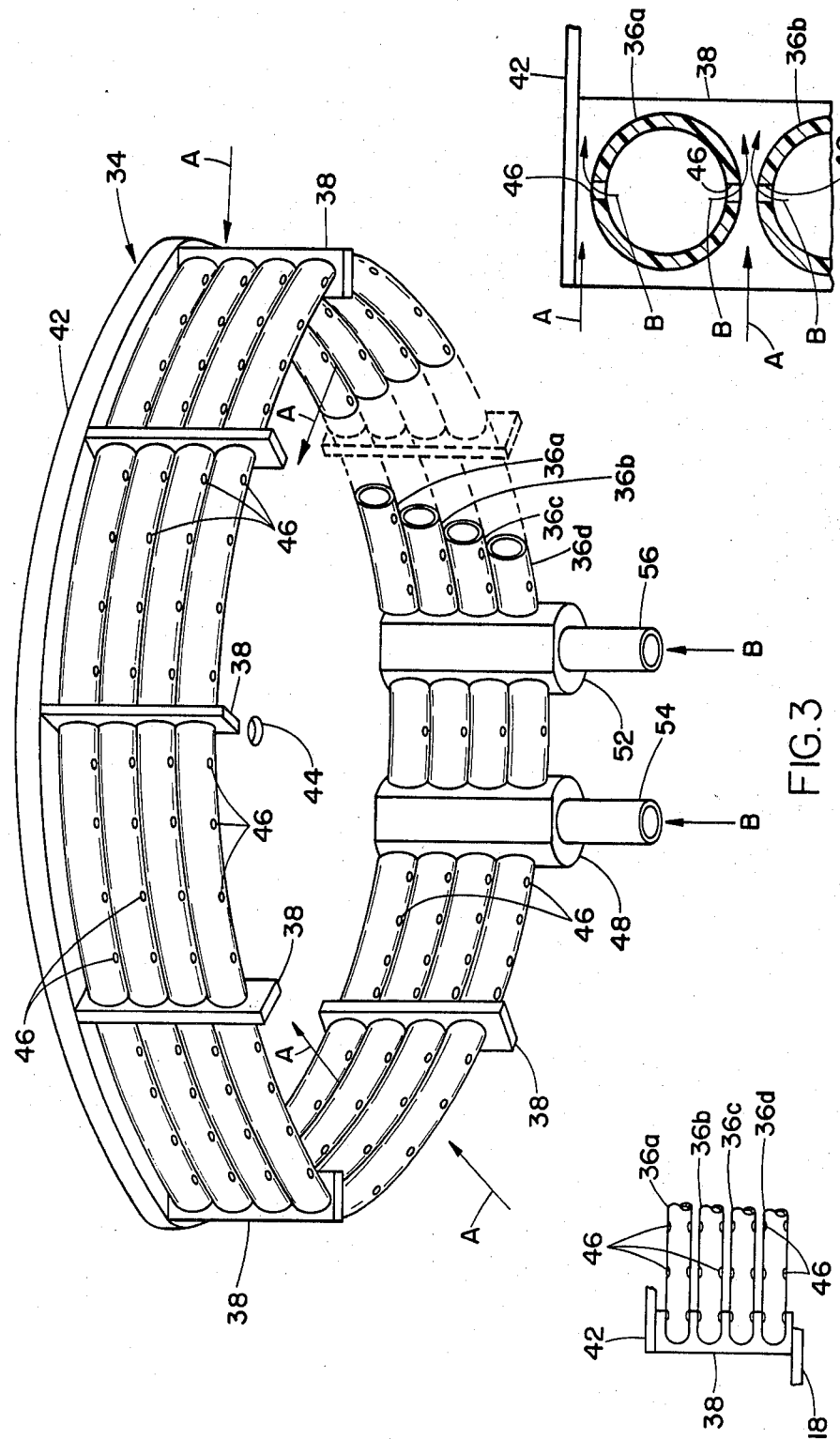

DUAL FLOW PROPANE UNIT

BACKGROUND OF THE INVENTION

This invention relates to apparatus and method for the delivery of gaseous fuels to internal combustion engines which use hydrocarbon as a fuel, particularly the engines of automobiles, trucks, tractors and airplanes.

The rapidly rising cost of gasoline during the last few years has encouraged interest in the use of alternative fuels in such engines and one of the alternatives is a class of fuels referred to as gaseous fuels. By gaseous fuels herein is meant hydrocarbon fuels which are gaseous under ambient conditions or light hydrocarbon liquids which become gaseous by preheating. Examples of these fuels are liquefied petroleum gases (LPG) containing propane or butane or mixtures of both, liquefied natural gas (LNG) containing predominantly methane with some ethane but no more than trace quantities of other materials, compressed natural gas (CNG) being more or less the same components as LNG but pressurized and not liquefied, and natural gas liquids (NGL) which are separated as liquids during the production of natural gas and contain, besides butane and propane, some ethane, pentane and heavier fractions. It is understood that reference herein to LPG includes all of the aforementioned gaseous fuels.

As a result of recent discoveries in the North Sea and other areas of the West, there is the prospect of a more plentiful supply of gaseous fuels becoming available over the next 10-20 years at prices below that of the cost of gasoline.

Gaseous fuels, LPG in particular, have been used with internal combustion engines for a long time. However, recent developments in federal mileage and emission requirements for the automotive and trucking industry have made it increasingly difficult to convert existing automobile and truck models to the use of LPG and continue to meet those requirements. This is especially the case for new models and those which will be coming off the assembly lines in the foreseeable future. In order to meet government mandated fleet mileage requirements and limits on emissions, manufacturers have been forced to rely heavily on regulating quite closely the operation of each engine. New vehicles are being produced with electronic ignition systems and computer controls which monitor engine operating parameters and adjust virtually on a continuous basis the air fuel mixture and engine timing.

One consequence of such sophisticated engine controls is the non-compatibility of existing devices which are used to convert an engine from gasoline use to LPG or other gaseous fuel operation. That is, when a conversion is made utilizing equipment heretofore available for supplying the LPG to the engine, conditions are created which are no longer recognizable by the control systems in place, and engine performance in terms of mileage and emissions is damaged if not totally destroyed. In other words, under the technology in existence prior to this invention, conversion from gasoline to LPG would require a major change in the control system supplied by the manufacturer. This would make the conversion either completely infeasible in terms of the economics or at best marginally so, plus there are technical problems which develop having to do with subsequent service and maintenance. In any event, prior to this invention the conversion of gasoline engines to LPG fuel has become more difficult if not completely impossible.

SUMMARY OF THE INVENTION

The present invention makes it possible to take a modern gasoline powered vehicle and convert same to the use of LPG fuel without disturbing the manufacturer supplied fuel controls and without altering the engine's operating characteristics, including the emission requirements met by the design of the engine.

In accordance with the principles of this invention, there is provided an LPG supply unit which when installed does not disturb the intake air and fuel characteristics significantly so that the manufacturer supplied control system will operate in its normal manner and produce the same results it was designed to produce with gasoline as the fuel. In view of this nondisturbance, even when the supply unit of this invention is in place, gasoline may be used when desired to fuel the engine, as for example, when LPG is not available.

In a preferred embodiment of this invention, there is provided a gaseous fuel supply system for an internal combustion engine having a carburetor with an air inlet and housing containing an air filter, the system including a gaseous fuel supply unit comprising a plurality of tubular elements arranged around the air inlet and supported in a stacked array forming a cylindrical or similar configuration and spaced from each other to permit air to pass between them. There is at least one manifold common to all of the elements to supply the gaseous fuel to the interior of the elements, and a pipe extending from the manifold through the housing for supplying the fuel to the manifold. Openings are provided in the tubular elements to discharge the fuel into the air which is flowing between the elements into the air inlet. The openings in a preferred embodiment are located on the portion of each surface between the tubes so that there is a uniform dispersion of the gaseous fuel in the intake air. The unit, when installed in accordance with the principles of this invention, does not alter the physical conditions under which the air enters the engine with the result that no modification of existing or new engine control systems involving control of fuel, ignition and emissions is required.

It is thus a principal object of this invention to provide apparatus for the use of gaseous fuels in internal combustion engines without disturbing either existing engine control system or limiting maximum air flow.

Another object of this invention is a method of adapting internal combustion engines for the use of gaseous fuels.

Other objects and advantages of this invention will hereinafter become obvious from the following description of preferred embodiments of this invention.

BRIEF DESCRIPTION OF THE DRAWINGS

FIG. 3 is an isometric view of the supply unit shown in FIG. 1.

FIGS. 4 and 5 are details illustrating spacing of the feed tubes and the openings for discharging the gaseous fuel.

DESCRIPTION OF THE PREFERRED EMBODIMENTS

Figure 1:
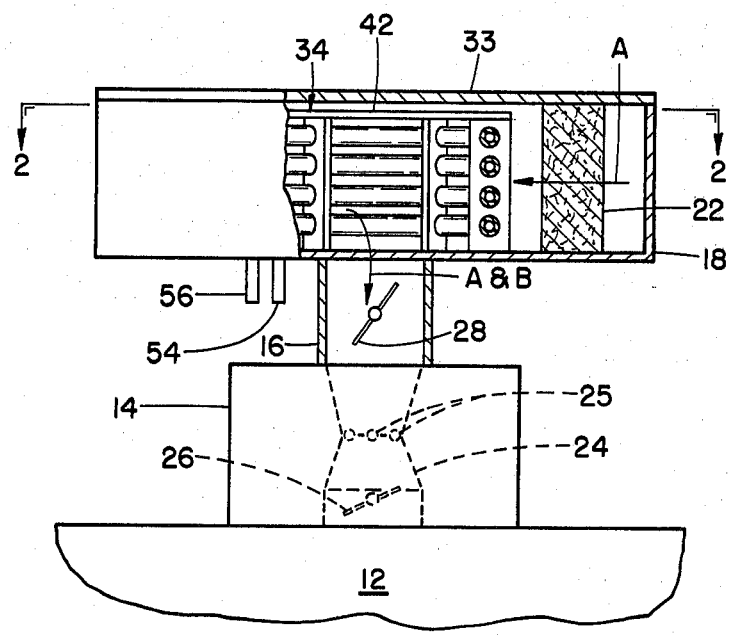
FIG. 1 is an elevation view in partial section and partially schematized, showing a typical installation of a preferred embodiment of this invention.
Figure 2:
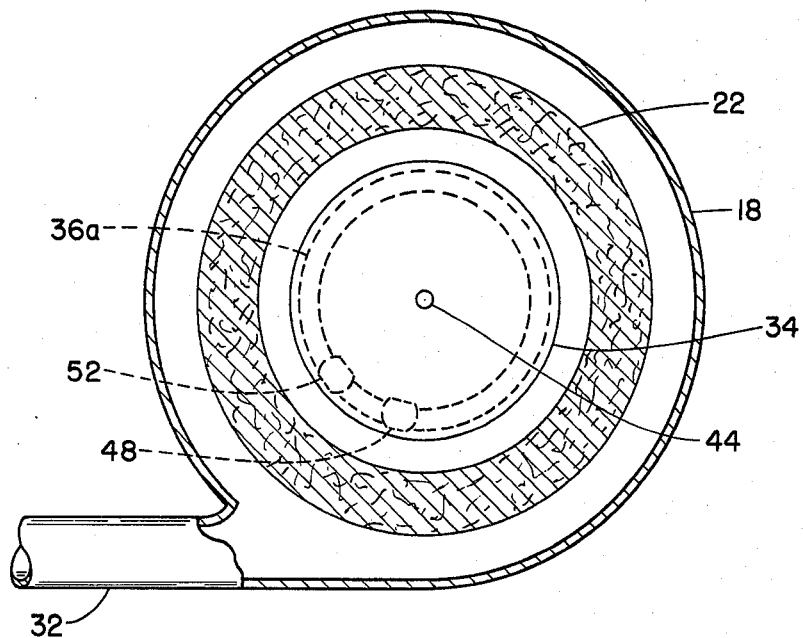
FIG. 2 is a section along 2—2 of FIG. 1.

Referring to FIGS. 1 and 2, there is illustrated an automotive normally gasoline fueled internal combustion engine 12 with a carburetor 14, an inlet pipe 16, and an air cleaner housing 18 for an air filter 22.

Carburetor 14 has a venturi passageway 24, with venturi openings 25, and a throttle 26 as is understood in the art. Inlet pipe 16 is provided with a butterfly type choke valve 28, while housing 18 is provided with a snorkel 32 for incoming air and a removable cover 33 which insures that all incoming air will enter through snorkel 32.

Within housing 18 is located a gaseous fuel supply unit 34 embodying the principles of this invention. When the latter is employed, gasoline is not supplied to carburetor 14, but no other alteration of the existing fuel supply system is required. Choke 28 and throttle 26 continue to function in their usual way. It has been found that the presence of the former does not interfere with operation of the engine.

Reference is made to FIGS. 3, 4 and 5 for details of supply unit 34. It will be seen that the latter consists of a plurality of circular feed tubes 36a, 36b, 36c, and 36d stacked as shown to form a cylindrical configuration and supported by a plurality of members 38 through which tubes 36a, 36b, 36c, and 36d pass. A cover plate 42 with a small opening 44 is provided to close off one end of the cylindrical configuration. Opening 44 is for a threaded bolt (not shown) to permit bolting down of plate 42. In some cases the cover 33 replaces plate 42 as will be seen later. It should be noted that tubes 36a, 36b, 36c and 36d are spaced from each other, and the size of this spacing is an important feature of this invention to be described below. Small openings 46 to discharge the gaseous fuel into the air stream are provided in tubes 36a–36d. Air flow is indicated by arrows A and fuel flow by arrows B. Openings 46 face at substantially right angles to the direction of the air flow, that is, where the spacing between adjacent tubes is narrowest, to obtain most thorough mixing of the two gaseous fluids.

The gaseous fuel is supplied to the interior of tubes 36a–36d by way of manifolds 48 and 52 and respective connecting pipes 54 and 56. Manifolds 48 and 52 are common to all of tubes 36a–36d and should be large enough to establish a condition wherein each of tubes 36a–36d is supplied with fuel at the same or uniform pressure, and, also, in integrating supply unit 34 into an automatic LPG control system, fuel pressure would be measured within these manifolds so a stable pressure is desired. One or more of manifolds 48 and 52 may be employed depending on the size of tubes 36a–36d and the rate of flow anticipated. However, at least two feed tubes are required in order to establish the flow conditions desired as will be described below, while the spacing of the feed tubes is also important. Connecting pipes 54 and 56 would pass either through the bottom (as illustrated) of housing 18 or through the top cover 33, and hoses (not shown) would be attached for supplying the gaseous fuel which typically would originate from a tank of LPG.

Referring back to FIG. 1, it will be noted that unit 34 is placed over inlet pipe 16 within housing 18, and that air filter 22 surrounds unit 34. As the latter is shorter than filter 22, cover 42 is required to insure that all air passes between and around tubes 36a–36d, to insure complete and even distribution of fuel in the incoming air. If unit 34 were taller, by virtue of either having more feed tubes, or tubes of larger diameter, so that the top of unit 34 were pressed against by cover 33, then of course cover plate 42 would not be required.

With regard to the spacing of tubes 36a–36d and the number and size of openings 46, it is necessary to insure that flow conditions will not depart drastically from the range of conditions existing when unit 34 is not installed. The purpose of establishing this criterion is to insure that the engine control system being provided by the manufacturer for meeting fuel consumption and emission goals required by law and regulation will be fully effective with unit 34 in place, without altering or modifying the engine control system or reducing maximum air flow.

In this invention, this is accomplished by incorporating into unit 34 some very important features. The total cross sectional area, summed up, of the spaces between and around tubes 36a–36d should be at least equal to the total cross sectional area of the venturi passageway 24 at its waist in carburetor 14 or snorkel 32, whichever is smaller, but not in excess of 120% of that figure, in other words, in the range of about 100–120%. In addition, the spacing between adjacent tubes 36a–36d should be at least 0.8 mm. with the preferred upper limit of about 1.0 mm. The diameter of openings 46 should be at least about 1.8 mm. with an upper limit of about 2.2 mm. Hence, the use of unit 34 as described does not involve any significant added restriction in the flow of air to engine 12. The number of openings 46, their spacing, and the size (i.e. diameter) of tubes 36a–36d may be varied as long as the requirements noted above are met, and the openings on the end tube facing away from the stack may be omitted if there is no space at the end for air flow.

It should be noted that by using a plurality of fuel feed tubes 36a–36d, air flow into engine 12 is split up which insures a better and more even distribution of the fuel within the air.

It has been found that when supply unit 34 as described herein is installed in accordance with this invention, engine 12 will function satisfactorily, meeting substantially all manufacturer's specifications with regard to mileage and emissions. In addition, over existing LPG installations prior to this invention there is significant improvement in mileage and performance plus better starting characteristics.

One of the additional advantages of this invention over previous devices designed to utilize LPG and other gaseous fuels is that unit 34 may be constructed of material other than metal, such as any rigid plastic capable of being shaped or formed into tubes 36a–36d, manifolds 48 and 52, and connecting pipes 54 and 56. Supporting members 38 may be made from a light weight metal if desired or a suitable rigid plastic. In any event, unit 34 itself is light in weight and relatively inexpensive to manufacture.

In FIG. 1, unit 34 is illustrated within air cleaner housing 18 as being directly over inlet pipe 16 and surrounded by air filter 22. Under some circumstances it might be desirable to use a filter of smaller diameter and a unit 34 of larger diameter so that the latter can surround air filter 22. As the fuel is gaseous, such an arrangement will function adequately in accordance with the principles of this invention.

While only a preferred embodiment of this invention has been described, it is understood that many modifications thereof may be employed while remaining within the scope of the principles of this invention.

What is claimed is:

1. A supply unit for discharging a gaseous fuel into a flow of air comprising a plurality of stacked tubular elements, means for supporting said tubular elements to be spaced from each other, means for limiting flow of air to between and around said elements, manifold means communicating in parallel with the interiors of said tubular elements for maintaining a uniform fuel pressure within said elements, means for supplying gaseous fuel under pressure to said manifold means, and rows of spaced openings in said tubular elements for discharging said fuel directly into said air in a direction parallel to the axial length of said stacked tubular elements.

2. The supply unit of claim 1 in which the spaces between adjacent tubes is in the range of about 0.8 to about 1.0 mm.

3. In a gaseous fuel supply system for an internal combustion engine having an air inlet and housing means at said inlet for containing an air filter, inlet air to said engine flowing into said housing and through said air filter into said air inlet, the improvement comprising a supply unit within said housing means, said supply unit comprising a plurality of spaced tubular elements mounted so that air passing through said filter into said air inlet also passes through the spaces between said spaced tubular elements, manifold means mounted on said unit communicating with each of said tubular elements in parallel for delivering gaseous fuel to the interior of each of said elements and maintaining uniform fuel pressure within said elements, means extending from said manifold means and out through said housing for delivering gaseous fuel to said manifold means, and rows of spaced openings in said tubular elements located on the surface of each of said elements facing the adjacent tubular element, whereby gaseous fuel emanating from each of said openings mixes directly with the air flowing between said adjacent elements.

4. The gaseous fuel supply system of claim 3 in which said tubular elements are arranged around said air inlet, and means are provided to insure that all air passing through said air filter also passes through the spaces between and around said tubular elements.

5. The gaseous fuel supply system of claim 4 in which the spaces between adjacent tubes is in the range of about 0.8 to about 1.0 mm.

6. In a gaseous fuel supply system for an internal combustion engine having a carburetor with an air inlet and housing means at said air inlet for containing an air filter, inlet air for said engine flowing through said housing into said air inlet, the improvement comprising a supply unit within said housing adjacent said air filter for replacing fuel delivered to said engine by way of said carburetor with gaseous fuel, said supply unit comprising a plurality of tubular elements arranged around said air inlet, means for supporting said tubular elements in a relationship whereby said elements are stacked in a configuration and spaced from each other, whereby all incoming air passes between and around said elements, manifold means mounted on said unit communicating with each of said tubular elements in parallel for delivering gaseous fuel to the interior of each of said elements and maintaining uniform fuel pressure within said elements, means extending from said manifold means and through said housing for delivering gaseous fuel to said manifold means, and rows of spaced openings in each of said tubular elements located on the surface of each of said elements for discharging said fuel directly into said air at right angles to the flow of said air between said elements, whereby gaseous fuel emanating from each of said openings mixes with air flowing between and around said adjacent elements, through said air filter and into said air inlet.

7. The fuel supply system of claim 6 in which the spaces between adjacent tubes is in the range of about 0.8 to about 1.0 mm.

8. The fuel supply system of claim 7 in which the carburetor has a venturi passageway and said housing has air inlet means, and the total cross sectional area of the spaces between and around said tubular elements when summed up is in the range of about 100 to 120% of the smaller of the cross sectional area of the aforesaid venturi passageway or said air inlet means.

* * * * *